Figures 1, 2:
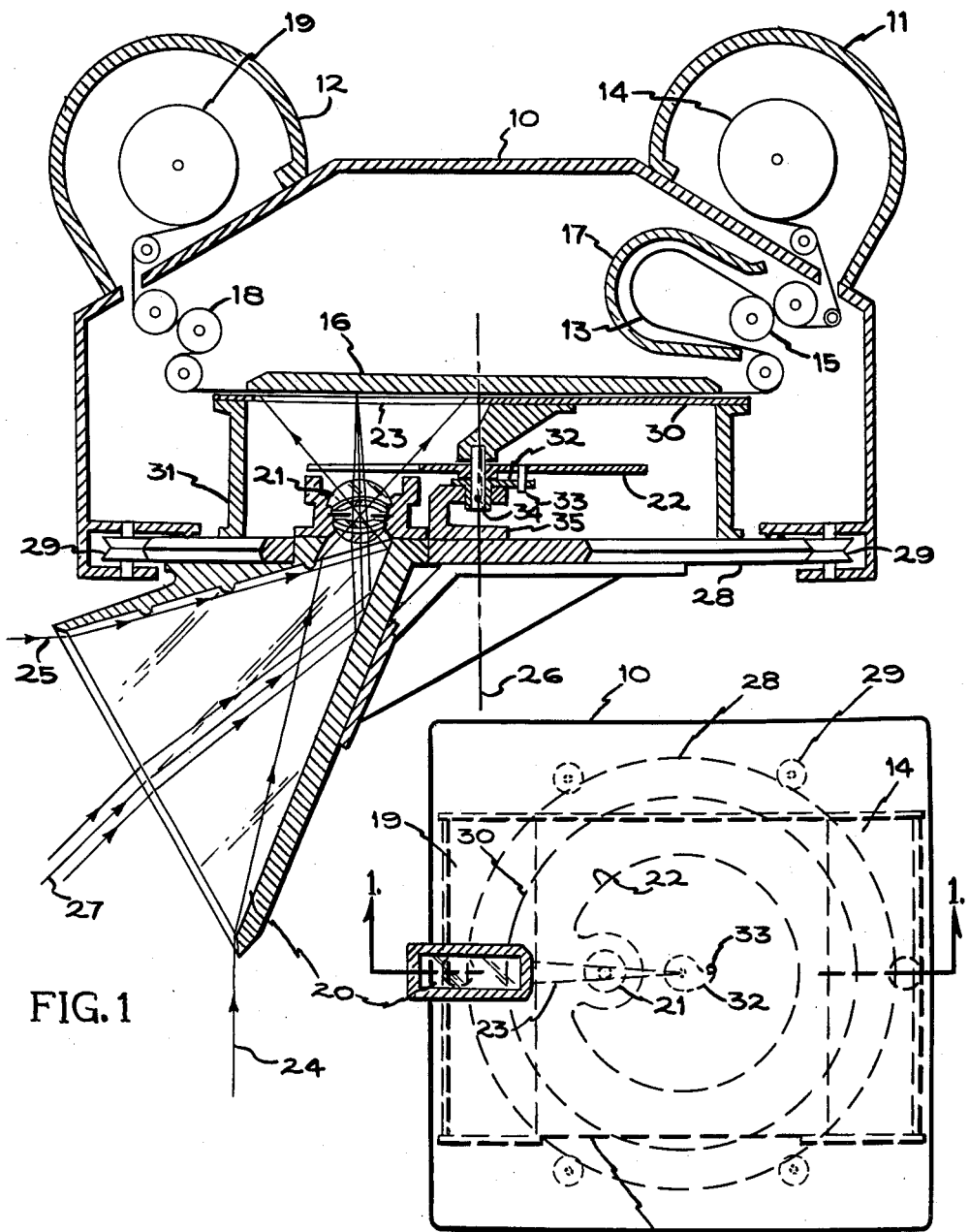

Jan. 9, 1962     F. T. SONNE     3,016,001
POLAR CAMERA
Filed Nov. 19, 1958

INVENTOR.
FREDERICK T. SONNE
BY Jacque L. Meister
AGENT

3,016,001
POLAR CAMERA
Frederick T. Sonne, Northbrook, Ill., assignor, by mesne assignments, to Chicago Aerial Industries, Inc., Melrose Park, Ill., a corporation of Delaware
Filed Nov. 19, 1958, Ser. No. 775,081
7 Claims. (Cl. 95—15)

My invention relates in general to cameras of the panoramic type and in particular to cameras which may be employed in making flat panoramic photographs covering a complete field of view of 180 degrees and having a radial, i.e. a polar, nature.

In one specific aspect, my invention relates to a novel camera wherein an adjustable aperture is rotated about an axis which is perpendicular to the plane of view being photographed so as to effect a polar exposure at the film plane, the film plane being located essentially parallel with the plane of view being photographed.

A number of circumstances exist wherein photographs having a wide field of coverage have proved to be valuable. In aerial photography, particularly with respect to map making and reconnaissance, such photographs permit determination of the positional relationships of widely spaced points of interest.

Heretofore, photographs covering a wide field have been obtained by several various schemes. A series of overlapping, narrow angle photographs taken with a single camera may be assembled into a composite photograph or mosaic. A plurality of cameras each covering an assigned area may be arranged also to secure photographs suitable for assembling. Further, a single camera designed to sweep out a spherical sector may provide wide angle coverage, but a number of such photographs may be required if all the objects of interest are not within one such sector. In addition, panoramic cameras have been built which employ an inclined rotating film format in a vertical rotating camera body. However, the geometry and optics of these latter cameras preclude sequential photography and result in an annular photograph which must be supplemented with a second circular photograph corresponding to the area enclosed by the annulus.

Use of these prior art schemes in modern reconnaissance aircraft is discouraged by the bulk or weight of the installation or the extensive time required to obtain the necessary photographic coverage. Furthermore, by none of these prior art schemes is a single photograph of the entire view from horizon to horizon in all directions obtainable.

My invention therefore takes as a general object the provision of a novel camera by which it is possible to obtain a single photograph covering a 180 degree field of view in all directions.

A further object of my invention is the provision of such a panoramic camera which is characterized by its compactness and lightness of weight.

A still further object of my invention is the provision of a polar panoramic camera which uses roll film, employs a mechanical film feed system, and is thus enabled of taking a large number of photographs before reloading is necessary.

Other objects and advantages of my invention will appear more fully hereinafter from a consideration of the detailed description which follows, taken together with the accompanying claims and with the drawings wherein one embodiment of the invention is shown.

My invention, both to its structure and mode of operation, will be better understood by reference to the following disclosure and drawings forming a part thereof, wherein:

FIGURE 1 is a diagrammatic sectional side-view of the camera in accordance with my invention taken along section 1—1 of FIGURE 2; and FIGURE 2 is a bottom view partially in invisible outline of the camera shown in FIGURE 1.

Referring now to the drawings for a more detailed description of my invention, a light-tight camera shell or housing 10 supports a film supply magazine 11 and a film take-up magazine 12. The photographic film 13 which is stored in reel 14 is withdrawn from supply magazine 11 by the system of rollers 15. Film 13 subsequently is passed across platen 16, which platen may be perforated to permit evacuation of the space between the film and the platen. When thus evacuated, platen 16 is enabled of holding the film in a flat plane.

During the actual photographing period, film 13 may be held stationary across platen 16. In such instance, since the system of rollers 15 may be arranged to withdraw film continuously from reel 14, a guide 17 is provided as a reservoir for the film withdrawn during such periods. Between the photographing periods, system of rollers 18 draws the exposed portion of film 13 from platen 16 in order that it may be stored on reel 19. Slack film in reservoir-guide 17 may be taken up in the process.

It is readily apparent that substitution of the film drive arrangement of my U.S. Patent No. 2,713,814 entitled, "Aircraft Camera," in the present invention can be arranged to provide image-motion-compensation for those circumstances where that feature is desired. Such provision is of particular advantage when my present invention is used in modern high speed reconnaissance aircraft.

Arranged with camera housing 10 and its associated film feed system is the rotating optical assembly comprised of prism 20, lens system 21, shutter 22, and exposure slit 23. Prism 20 acts to collect the image bounded by nadir ray 24 and horizontal ray 25, directing that image by reflection and refraction to lens system 21 from whence it is focused onto the sensitive area of the film 13. The nadir ray 24 enters prism 20 parallel to the camera axis 26 and is refracted to a point which is located approximately at the center of the format of film 13. Horizontal ray 25, on the other hand, enters prism 20 at an angle of approximately 90 degrees with the camera axis 26, being reflected and refracted to the edge of the format. Light ray 27 entering prism 20 at an angle of approximately 45 degrees is reflected and refracted to a point midway out in the picture area of the film.

So that I can use my camera to photograph a full view of all objects beyond a plane passing through its front, i.e. through that part of the camera which is associated with admitting the image, I rotate disc 28 as by applying motive force to the sheaves 29 on which the disc is supported. With the film 13 being held stationary at platen 16, rotation of disc 28 achieves a rotation of the prism 20, lens system 21, shutter 22, and exposure slit 23 which are carried thereupon.

The slit 23, which may take the form of a sector, a triangle or any other figure having an apex, acts to confine the light incident upon film 13; and since the apex of the slit falls on camera axis 26, rotation of the slit is able to generate a radial exposure, more particularly, an exposure having the various objects of the photographed scene locatable according to a system of polar coordinates.

Furthermore, slit 23 is preferably of adjustable width, as by being comprised of movable slit leaves, in order to permit varying the exposure, although a varying exposure may also be achieved by varying the speed at which the optical assembly is rotated. Slit 23 is carried in slit plate 30 and is rotated simultaneously with disc 28 to which it is attached by means of support 31.

When the optical assembly completes its cycle of rotation, trigger 32 is driven, as by a shutter-operating motor through an overrunning clutch and gearing, against the spring bias of the shutter 22. To the shutter 22 is advantageously affixed a pin 33 for engaging the trigger. In this manner, the shutter may be rotated into its aperture-obstructing position. After the film has been recycled to present an as yet unexposed portion and it is desired to take a second photograph, the shutter-operating motor is de-energized; and the energy stored in the shutter biasing spring rotates the shutter 22 into its aperture-clearing position. In order to facilitate shutter operation, trigger 32 is rigidly fastened to shaft 34 as by pinning, whereas shutter 22 is made pivotable about shaft 34 within the limits established by trigger 32 and the shutter biasing spring which is affixed between shutter 22 and bracket 35.

Prism 20 is selected to be capable of collecting a wide angle field of view, desirably 90 degrees, and as a consequence, is preferably manufactured from optical glass having a high index of refraction, of the order of 1.80. In one specific embodiment, it has been found to be advantageous to have the angle between the entrance face of prism 20 and the reflecting face to be substantially equal to the angle between the exit face and the reflecting face, a value of approximately 52 degrees having proved useful. Furthermore, the prism 20 is preferably made only thick enough to include the free aperture of lens system 21 and, in addition, is desirably made totally reflecting.

In this manner, when it is desired to take photographs, shutter 22 is rotated into its aperture-clearing position at the same time that disc 28 is started through its circuit of rotation. Thus, the field of view that is collected by prism 20 is imaged by lens system 21 and passed by slit 23 to the film 13 being held at platen 16. As the prism 20 and its associated elements are rotated, a single circular exposure is generated on the film 13 which exposure is made up of a continuous series of overlapping individual exposures whose shape is determined by the shape of slit 23.

When the circuit of exposure is completed, the shutter 22 is rotated into its aperture-obstructing position and the system of rollers 18 draws a fresh supply of film across the platen 16, readying the camera for the taking of a new photograph.

Thereby, when my camera is used as an aerial camera, a picture of the entire area from nadir to the horizon in all directions is obtained. Such a picture can be used as an accurate record of, for example, an aerial-laid minefield, the location of the mines being determinable by triangulation and intersection methods, employing known points photographed on the horizon. Furthermore, by being so mounted as to cover the area above it, my camera may be used, for example as a training aid in conjunction with anti-aircraft efforts, a series of the polar panoramic photographs revealing the series of events in all sectors. Other uses will become readily apparent to those versed in the panoramic camera art.

While the embodiment described herein is at present considered to be preferred, it is understood that variations and modifications may be made therein; and it is intended to cover in the appended claims all such variations and modifications as fall within the true spirit and scope of the invention.

What I claim is:

1. A panoramic camera comprising: a lighttight camera housing; a first and a second film holding device affixed exteriorly to said housing; a flat, film platen located within said housing and disposed parallel with the plane of view to be photographed; film transport means for cyclically withdrawing film from said first film holding device, conducting said film across said platen and directing said film to said second film holding device; support means rotatably mounted to said housing; a prism affixed to said support means for collecting a wide angle field of view extending radially from the nadir and adapted to be rotatable with said support means for collecting said field of view through a full circle circuit of revolution; a wide angle lens system cooperatively associated with said prism for imaging at said platen the view collected by said prism; an exposure slit rotatable with said support means for restricting the view that is imaged by said lens system; and a shutter pivotally mounted to said support means for selectively obstructing the image path to said platen.

2. A panoramic camera comprising: a lighttight camera housing; a first and a second film holding magazine affixed exteriorly to said housing and adapted to employ roll film; a flat, film platen located within said housing and disposed parallel with the plane of view to be photographed; film transport means for cyclically withdrawing film from said first film holding magazine, conducting said film across said platen and directing said film to said second film holding magazine; a support disc rotatably mounted to said housing and disposed parallel with said film platen; a prism affixed to said disc for collecting a wide angle field of view extending radially from the nadir and adapted to be rotatable with said disc for collecting said field of view through a full circle circuit of revolution; a wide angle lens system cooperatively associated with said prism for imaging at said platen the view collected by said prism; and apexed, adjustable-width exposure slit rotatable with said disc for restricting the view that is imaged by said lens system at said platen; and a shutter pivotally mounted to said disc for selectively obstructing the image path to said platen.

3. A panoramic camera as described in claim 2 wherein the angle between the entrance face and the reflecting face of said prism and the angle between the exit face and the reflecting face are each equal to 52 degrees.

4. A panoramic camera comprising: a lighttight camera housing; a first and a second film holding magazine affixed exteriorly to said housing and adapted to employ roll film; a flat, film platen located within said housing and disposed parallel with the plane of view to be photographed; film transport means for cyclically withdrawing film from said first film holding magazine, conducting said film across said platen and directing said film to said second film holding magazine; a support disc rotatably mounted to said housing and disposed parallel with said film platen; a prism affixed to said disc for collecting a 90 degree field of view extending radially from the nadir and adapted to be rotatable with said disc for collecting said field of view through a full circle circuit of revolution; a wide angle lens system cooperatively associated with said prism for imaging at said platen the view collected by said prism; an apexed, adjustable-width exposure slit rotatable with said disc for restricting the view that is imaged by said lens system at said platen; and a shutter pivotally mounted to said disc for selectively obstructing the image path to said platen.

5. Apparatus for taking in a single exposure a circular photograph of the full view of objects beyond a plane passing through the front of said apparatus comprising: camera means; a flat, stationary film plane disposed within said camera means parallel with said plane passing through the front of said apparatus; film transport means operatively associated with said camera means for cyclically moving photographic film across said film plane; and optical means mounted to said camera means for collecting a portion of said full view and adapted to be rotated about and axis perpendicular to said film plane so as to display at said film plane a complete revolution of said portion of said view, said optical means including a rotatable support, a prism for collecting a field of view extending angularly from said rotational axis, a lens system for imaging on said photographic film at the intersection of said rotational axis and said film plane the nadir rays collected by said prism and for imaging on said photographic film the oblique rays collected by said prism at a distance from said intersection that is proportional to the angle of obliquity, an exposure slit for restricting the view imaged by said lens system, and shutter means for selectively obstructing the image path to said photographic film whereby rotation of said optical means effects a polar exposure on said photographic film.

6. A polar panoramic camera comprised of: a camera housing; a flat film plane disposed within said housing parallel with the plane of view to be photographed; film transport means for conducting photographic film across said film plane; and optical means connected to said housing rotatable about an axis perpendicular to said film plane for collecting a wide angle field of view extending angularly from said rotational axis and presenting a full circle revolution of said field of view at said film plane, said optical means comprising support means for supporting and rotating an optical assembly including a prism for collecting said field of view, a lens system for imaging the nadir rays collected by said prism at the intersection of said film plane and said rotational axis and for imaging the oblique rays collected by said prism at said film plane a distance from said intersection that is a function of the angle of obliquity, and an apexed exposure slit.

7. A polar panoramic camera comprised of: a camera housing; a flat, stationary film plane disposed within said housing parallel with the plane of view to be photographed; film transport and storage means for cyclically conducting unexposed film across said film plane; optical means mounted to said housing for rotation about an axis perpendicular to said film plane for collecting a wide angle field of view extending angularly from said rotational axis and presenting a full circle revolution of said field of view on said unexposed film; said optical means comprising support means for supporting and rotating an optical assembly including a prism for collecting said field of view, a lens system for imaging the nadir rays collected by said prism at the intersection of said film plane and said rotational axis and for imaging the oblique rays collected by said prism on said film plane a distance from said intersection that is a function of the angle of obliquity, an exposure slit for restricting the view imaged by said lens system, and shutter means for selectively obstructing the image path to said unexposed film.

References Cited in the file of this patent

UNITED STATES PATENTS

| 994,935 | Kleinschmidt | June 13, 1911 |

FOREIGN PATENTS

| 175,806 | Great Britain | Mar. 2, 1922 |
| 380,102 | Germany | May 24, 1922 |